(12) United States Patent
Matsuda et al.

(10) Patent No.: US 8,293,827 B2
(45) Date of Patent: Oct. 23, 2012

(54) METHOD FOR PRODUCING A RUBBER COMPOSITION

(75) Inventors: Takashi Matsuda, Kanagawa-ken (JP); Makoto Ashiura, Kanagawa-ken (JP); Tetsuji Kawazura, Kanagawa-ken (JP)

(73) Assignee: The Yokohama Rubber Co. Ltd (JP)

( * ) Notice: Subject to any disclaimer, the term of this patent is extended or adjusted under 35 U.S.C. 154(b) by 282 days.

(21) Appl. No.: 12/612,295

(22) Filed: Nov. 4, 2009

(65) Prior Publication Data

US 2010/0113684 A1 May 6, 2010

(30) Foreign Application Priority Data

Nov. 4, 2008 (JP) ................................. 2008-283670

(51) Int. Cl.
*C04B 24/26* (2006.01)
(52) U.S. Cl. ..................................... 524/354; 524/575.5
(58) Field of Classification Search .................. 524/354, 524/575.5
See application file for complete search history.

(56) References Cited

U.S. PATENT DOCUMENTS

| | | | | |
|---|---|---|---|---|
| 1,887,201 A | * | 11/1932 | Hayes et al. | 524/354 |
| 2002/0035195 A1 | * | 3/2002 | Toratani et al. | 524/501 |
| 2006/0189732 A1 | * | 8/2006 | Kanenari et al. | 524/236 |

FOREIGN PATENT DOCUMENTS

JP 2002-201203 7/2002

\* cited by examiner

*Primary Examiner* — Peter D Mulcahy

(74) *Attorney, Agent, or Firm* — Thorpe North & Western LLP

(57) ABSTRACT

A method for producing a rubber composition, the method including: preparing a modified natural rubber by releasing protein from rubber particles in a natural rubber latex by adding at least one organic compound selected from formaldehyde, paraformaldehyde, formalin, and glyoxal to the above mentioned natural rubber latex and then drying so as to include the released protein therein; and mixing at least one selected from carbon black and silica in this modified natural rubber. Such method reduces viscosity and improves molding processibility of the rubber composition, as well as reducing hysteresis loss.

20 Claims, No Drawings

METHOD FOR PRODUCING A RUBBER COMPOSITION

PRIORITY CLAIM

Priority is claimed to Japan Patent Application Serial No. JP2008-283670 filed on Nov. 4, 2008, which is incorporated herein by reference in its entirety.

TECHNICAL FIELD

The present invention relates to a method for producing a rubber composition. In particular, the present invention relates to method for producing a rubber composition that reduces viscosity and improves molding processability of the rubber composition, as well as reduces hysteresis loss.

BACKGROUND ART

Rubber compositions including natural rubber are widely used in industrial products such as pneumatic tires, belts, and adhesives since the mechanical properties thereof are excellent. However, in addition to excellent mechanical properties, improving fuel efficiency by reducing hysteresis loss and improving molding processability by reducing viscosity are desired for tread rubber of pneumatic tires. However, these properties are not necessarily sufficient with conventional rubber compositions containing natural rubber.

Also, epoxidation of natural rubber, graft polymerization of organic compounds, deproteinating treatments, and the like are known as modification means for imbuing natural rubber with new properties. For example, Japanese Patent Application Publication No. 2002-201203 suggests crosslinking proteins in a natural rubber latex by adding a protein denaturing agent such as glutaraldehyde thereto.

However, it was not possible to achieve the performance required for improvement in molding processability by low viscosity or for reduction of hysteresis loss even for a rubber composition including modified natural rubber obtained by such modification means.

An object of the present invention is to provide a method for producing a rubber composition that reduces viscosity and improves molding processability of a rubber composition with natural rubber, as well as reduces hysteresis loss.

SUMMARY OF THE INVENTION

The method for producing a rubber composition of the present invention that achieves the above-mentioned object includes preparing a modified natural rubber by releasing protein from rubber particles in a natural rubber latex by adding at least one organic compound selected from formaldehyde, paraformaldehyde, formalin, and glyoxal to the natural rubber latex and then drying so as to include the released protein therein; and mixing at least one selected from carbon black and silica in this modified natural rubber.

The natural rubber latex is preferably dried by spraying in an atmosphere of shock waves generated by pulse combustion. Preferably, 0.005 to 5.0 parts by weight of the organic compound is added with respect to 100 parts by weight of solid components in the natural rubber latex. The natural rubber latex is preferably field latex and/or concentrated latex. Preferably, 20 to 150 parts by weight of the carbon black and/or silica is blended with respect to 100 parts by weight of a diene-based rubber comprising the modified natural rubber.

The rubber composition obtained by the production method of the present invention is suitable as a constitutional member of pneumatic tires, particularly for constituting the tread portion.

Since the method for producing the rubber composition of the present invention releases protein from the rubber particles in a natural rubber latex by adding at least one organic compound selected from formaldehyde, paraformaldehyde, formalin, and glyoxal to the natural rubber latex and drying so as to include such released protein, the effect of the rubber particles is reduced through the drying operation of the natural rubber latex and the mixing operation of the natural rubber after the drying. Also, by drying without removing the released protein in the natural rubber latex the modified natural rubber is made to have low hysteresis loss and low viscosity; and by mixing carbon black and/or silica into the modified natural rubber it is possible to improve the dispersibility of carbon black and silica, reduce the viscosity of the rubber composition thus improving molding processability, and further reduce hysteresis loss.

BEST MODE FOR CARRYING OUT THE INVENTION

In the production method of the present invention, filtered field latex extracted from rubber trees or a concentrated natural rubber latex made by treating the field latex can be used as the natural rubber latex. These latexes can be used alone or together. Although there are no particular limitations on the amount of solid components in the natural rubber latex, it is preferably 10 to 70% by weight. Solid components in the natural rubber latex means all the solid components excluding the water content (serum) and the components dissolved therein.

In the method for producing the rubber composition of the present invention first, protein attached to the rubber particles in the natural rubber latex is released by adding and mixing at least one organic compound selected from formaldehyde, paraformaldehyde, formalin, and glyoxal to the natural rubber latex. Among these, it is possible to treat in a short period of time with formaldehyde, paraformaldehyde, and formalin since their power to penetrate protein is strong. These organic compounds may be used alone, or combinations of multiple organic compounds may be used.

By thereby releasing protein from the rubber particles, the effect of the protein at the time of preparing the modified natural rubber is reduced as much as possible. Also, because the natural rubber latex is dried while containing protein that is released but not removed, the obtained modified natural rubber has reduced viscosity and reduced hysteresis loss.

In the present invention, the added amount of the organic compound selected from formaldehyde, paraformaldehyde, formalin, and glyoxal is preferably 0.005 to 5.0 parts by weight and more preferably 0.1 to 2.0 parts by weight with respect to 100 parts by weight of the solid components in the natural rubber latex. If the added amount of the organic compound is less than 0.005 parts by weight, the effect of protein attached to rubber particles cannot be reduced since the effect of releasing the protein in the natural rubber latex cannot be sufficiently achieved. Also, if the added amount of the organic compound exceeds 5.0 parts by weight, the effect of releasing the protein levels off, and rather a problem occurs in that the organic compounds cause a polymerization reaction and the product thereof becomes an impurity leading to adverse effects on hysteresis loss.

In the present invention, protein in the natural rubber latex is released by the organic compound and this released protein is not separated and removed. This is because, when a natural rubber is deproteinated by separating and removing the released protein in the natural rubber latex by a centrifuge or the like, this deproteinated natural rubber cannot realize a decrease in hysteresis loss. Also, scorching worsens for deproteinated rubber, thereby causing rubber burning to easily occur. Furthermore, dispersibility cannot be improved when silica and carbon black are mixed therewith. Although the reason is unclear, low hysteresis loss and low viscosity can be realized when released protein is not separated and removed but is dispersed in the modified natural rubber.

In the production method of the present invention, although there are no particular limitations to the method for mixing the natural rubber latex and the organic compound, they are preferably mixed and stirred for 5 minutes to 1 hour at room temperature to 80° C. If the mixing temperature is lower than room temperature, mixing and stirring efficiency decreases. Also, if the mixing temperature is higher than 80° C., there is the risk that colloid particles in the natural rubber latex become unstable, thus making it impossible to disperse the rubber in water. If the mixing time is less than 5 minutes, the action of releasing protein is insufficient. Also, if the mixing time exceeds 1 hour, release of protein levels off and thus productivity declines.

Furthermore, a surfactant may be added to the natural rubber latex. The dispersion of rubber particles in the latex can be stabilized by the addition of a surfactant. Thus, even if the natural rubber latex becomes acidic, dispersion of the rubber particles becoming unstable can be suppressed, leading to the ability to prevent problems such as clogging of piping of the production line.

As the above-mentioned drying method of the natural rubber latex in the present invention, drying the natural rubber latex by a pulse combustion shock wave drying method is preferable. The pulse combustion shock wave drying method is a drying method performed by spraying the natural rubber latex into an atmosphere of shock waves generated by pulse combustion, which makes it possible to dry while not removing the released protein. Also, since the drying is done at a low temperature without applying excessive heat to the rubber particles in the natural rubber latex, it is possible to prevent heat degradation and gelling of the natural rubber. It is thus possible to prepare a modified natural rubber having low hysteresis loss and low viscosity. In contrast, when dried through coagulation of the natural rubber in the natural rubber latex and solid-liquid separation of the obtained solid component, it is not possible to obtain a modified natural rubber having excellent low hysteresis loss and low viscosity characteristics since at least a part of the released protein is removed with the water content.

The pulse combustion shock wave drying can be performed using a commercial pulse combustion shock wave drying apparatus (for example, Hypulcon made by Pultech Corporation). With respect to the drying conditions, a frequency of the pulse combustion is preferably 50 to 1,200 Hz and more preferably 250 to 1,000 Hz. The temperature of the drying room wherein the natural rubber latex is sprayed is preferably 40 to 100° C. and more preferably 50 to 70° C. Heat degradation and gelling of the natural rubber can be prevented by setting the conditions of pulse combustion shock wave drying within the above-mentioned ranges.

In the method for producing the rubber composition of the present invention carbon black and/or silica is mixed with the obtained modified natural rubber as mentioned above. Carbon black performs the function of increasing abrasion resistance of the rubber composition. Also, silica performs the function of further reducing hysteresis loss of the rubber composition. In the rubber composition obtained by the present invention, the modified natural rubber, being the base, has excellent low viscosity and low hysteresis loss, and the hysteresis loss is further reduced since the dispersibility of carbon black and/or silica is excellent.

In the production method of the present invention, preferably 20 to 150 parts by weight and more preferably 30 to 100 parts by weight of at least one selected from carbon black and silica is mixed in 100 parts by weight of a diene-based rubber that indcludes the modified natural rubber. The diene-based rubber including the modified natural rubber contains at least 20% by weight and preferably 25 to 100% by weight of the modified natural rubber. Also, examples of the diene-based rubber other than the modified natural rubber include natural rubber, isoprene rubber, various butadiene rubbers, various styrene-butadiene rubbers, various acrylonitrile-butadiene rubbers, and various butyl rubbers. These diene-based rubbers may be blended alone or in combination with others.

If the blended amount of carbon black and silica is less than 20 parts by weight with respect to 100 parts by weight of the diene-based rubber, the rubber composition cannot be sufficiently reinforced. Also, if the blended amount of carbon black and silica exceeds 150 parts by weight, viscosity of the rubber composition increases and thus molding processability worsens. Carbon black and silica may be blended singly. Also, carbon black and silica may be blended together. When carbon black and silica are both used, the blended proportion of silica in the total amount of carbon black and silica may be 10 to 97% by weight.

A nitrogen specific surface area ($N_2SA$) of the carbon black used in the present invention is preferably 20 to 200 $m^2/g$ and more preferably 40 to 150 $m^2/g$. If the nitrogen specific surface area is less than 20 $m^2/g$, reinforcement of the rubber composition will be insufficient. If the nitrogen specific surface area exceeds 200 $m^2/g$, the dispersibility of carbon black in the rubber worsens and thus the breaking strength deteriorates. The nitrogen specific surface area is measured in accordance with JIS K6217-2.

In the present invention, when silica is blended into the rubber composition, preferably 3 to 15% by weight and more preferably 5 to 10% by weight of a silane coupling agent is blended with respect to the weight of the silica. It is possible to improve the dispersibility of the silica and further reduce hysteresis loss by blending of the silane coupling agent. If the silane coupling agent is less than 3% by weight of the weight of the silica, the effect of improving dispersion of the silica cannot be expected. Also, if the silane coupling agent exceeds 15% by weight, the silane coupling agents condense and the desired effects cannot be achieved.

As the silane coupling agent, it is possible to use any silane coupling agent that can be used in a rubber composition having silica blended therein. Among these, sulfur-containing coupling agents are preferable and bis-(3-triethoxysilylpropyl)tetrasulfide, bis-(3-triethoxysilylpropyl)disulfide, 3-trimethoxysilylpropyl benzothiazole tetrasulfide, γ-mercaptopropyl triethoxysilane and 3-octanoylthiopropyl triethoxysilane, and the like can be given as examples.

In addition to carbon black and silica, compounding agents such as fillers and additives normally used in rubber compositions can be added to the rubber composition of the present invention. As fillers, clay, calcium carbonate, talc, mica, aluminium hydroxide, magnesium carbonate, and the like for example can be blended as necessary. As additives, vulcanizing agents or cross-linking agents, vulcanization accelerators, zinc oxide, stearic acid, anti-oxidants, plasticizers, softeners, lubricants, coloring agents, tackifiers, coupling agents and the like can be given as examples. These fillers and additives can be blended at conventional general amounts so long as the objects of the present invention are unhindered. A rubber composition can be produced according to the method for producing the rubber composition of the present invention by mixing each of the above-mentioned components using a well-known rubber kneading machine such as a Banbury mixer, a kneader, a roll, or the like.

The rubber composition obtained by the production method of the present invention is suitable for constituting at least one member of a pneumatic tire. As constitutional members of a pneumatic tire, a tread portion, a side wheel portion, a bead portion, a plycoat rubber of various reinforcing cords, and the like can be given as examples. In particular, the rubber composition obtained by the production method of the present invention may be used in at least one member selected from the group consisting of a cap tread portion, a side tread portion, an under tread portion, a belt edge cushion, a bead filler, a rim cushion, carcass coat rubber, and belt coat rubber. Among these, application in the tread portion is particularly preferred. Tire treads using the rubber composition of the present invention efficiently exhibit the characteristics of natural rubber. At the same time, since the rubber composition of the present invention has excellent molding processibility and is stably molded, high quality can be stably achieved. Fuel efficiency can be simultaneously improved since hysteresis loss is small.

The present invention is further explained below by examples. However, the scope of the present invention is not limited to these examples.

EXAMPLES

Preparation of Modified Natural Rubber

As shown by the formulations in Table 1, five types of modified natural rubbers (N-1 to N-5) were prepared as follows: after adding the organic compound so that such became 1 part by weight with respect to 100 parts by weight of the solid components in the natural rubber latex and mixing by stirring with a mechanical stirrer, drying by spraying at a flow of 2 L/hour in an atmosphere of shock waves generated by pulse combustion (frequency: 1,000 Hz and temperature: 60° C.) using a pulse combustion shock wave drying apparatus (Hypulcon small laboratory dryer made by Pultech Corporation). With respect to NR-4, the natural rubber latex was dried without adding organic compounds to the natural rubber latex. With respect to NR-5, the organic compound was added to the natural rubber latex, protein was released, and after removing such released protein using a centrifuge, the natural rubber latex was dried.

Production and Evaluation of Rubber Compositions

Using the obtained five types of modified natural rubbers (NR-1 to NR-5), the blending components other than the vulcanization accelerators and sulfur were weighed in the amounts shown in Table 2, the mixture was kneaded for 4 minutes in a 0.6 L Banbury mixer, the kneaded product was discharged at 130 to 140° C., and then cooled to room temperature. The vulcanization accelerators and sulfur were added to this kneaded product and seven types of rubber compositions (Examples 1 to 4 and Comparative Examples 1 to 3) were produced using an electrically-heated roll.

The Mooney viscosity of the seven types of obtained rubber compositions was measured by the below method. Also, test pieces were prepared by vulcanizing each of the obtained rubber compositions in a mold having a given shape for 15 minutes at 160° C. and the hysteresis loss (tan δ) was measured by the method shown below.

Mooney Viscosity ($ML_{1+4}$)

The Mooney viscosity ($ML_{1+4}$) of the obtained compositions was measured in accordance with JIS K6300 using an L-type rotor (diameter: 38.1 mm and thickness: 5.5 mm) in a Mooney viscometer under the conditions of a preheating time of 1 minute, a rotor rotation time of 4 minutes, 100° C., and 2 rpm. The obtained results are shown in Table 2. The smaller the Mooney viscosity, the lower the viscosity, which means excellent molding processibility.

Hysteresis Loss (tan δ)

The tan δ at a temperature of 60° C. of the obtained test pieces was measured using a viscoelasticity spectrometer made by Iwamoto Seisakusho under the conditions of an elongation deformation strain rate of 10%±2% and a frequency of 20 Hz. The obtained results are shown in Table 2. The smaller the tan δ (60° C.), the smaller the hysteresis loss, which means excellent fuel efficiency.

TABLE 1

|  |  |  | NR-1 | NR-2 | NR-3 | NR-4 | NR-5 |
|---|---|---|---|---|---|---|---|
| Solid components in NR latex |  | pbw | 100 | 100 | 100 | 100 | 100 |
| Organic compounds | Formalin | pbw | 1 |  |  |  | 1 |
|  | Paraformaldehyde | pbw |  | 1 |  |  |  |
|  | Glyoxal | pbw |  |  | 1* |  |  |
| Processed in centrifuge |  |  | No | No | No | No | Yes |

*Blended so that the net glyoxal became 1 part by weight.

The types of raw materials used are shown in Table 1 above.

NR latex: concentrated natural rubber latex, concentrated natural rubber latex made by FELTEX (processed in a centrifuge so that the amount of solid components becomes 60% by weight)

Formalin: 20% formalin solution made by Wako Pure Chemical Industries, Ltd.

Paraformaldehyde: paraformaldehyde made by Wako Pure Chemical Industries, Ltd.

Glyoxal: 40% aqueous glyoxal solution made by Wako Pure Chemical Industries, Ltd.

TABLE 2

| Type | Weight | Ex. 1 NR-1 | Ex. 2 NR-2 | Ex. 3 NR-3 | Comp. Ex. 1 NR-4 | Comp. Ex. 2 NR-5 | Ex. 4 NR-1 | Comp. Ex. 3 NR-4 |
|---|---|---|---|---|---|---|---|---|
| Modified natural rubber | pbw | 100 | 100 | 100 | 100 | 100 | 100 | 100 |
| Silica | pbw | 75 | 75 | 75 | 75 | 75 | 0 | 0 |
| Carbon black | pbw | 0 | 0 | 0 | 0 | 0 | 50 | 20 |
| Silane coupling agent | pbw | 6 | 6 | 6 | 6 | 6 | 0 | 0 |
| Anti-oxidant | pbw | 2 | 2 | 2 | 2 | 2 | 2 | 2 |
| Stearic acid | pbw | 1 | 1 | 1 | 1 | 1 | 3 | 3 |

TABLE 2-continued

| Type | Weight | Ex. 1 NR-1 | Ex. 2 NR-2 | Ex. 3 NR-3 | Comp. Ex. 1 NR-4 | Comp. Ex. 2 NR-5 | Ex. 4 NR-1 | Comp. Ex. 3 NR-4 |
|---|---|---|---|---|---|---|---|---|
| Zinc oxide | pbw | 3 | 3 | 3 | 3 | 3 | 5 | 5 |
| Aromatic oil | pbw | 30 | 30 | 30 | 30 | 30 | 0 | 0 |
| Vulcanization accelerator 1 | pbw | 2 | 2 | 2 | 2 | 2 | 1 | 1 |
| Vulcanization accelerator 2 | pbw | 1 | 1 | 1 | 1 | 1 | 0 | 0 |
| Sulfur | pbw | 2 | 2 | 2 | 2 | 2 | 2 | 2 |
| Mooney viscosity | | 54.3 | 52.3 | 21.7 | 55.8 | 53.6 | 49.5 | 56.3 |
| tan δ (60° C.) | | 0.233 | 0.219 | 0.23 | 0.247 | 0.243 | 0.113 | 0.127 |

The types of raw materials used are shown in Table 2 above.
Silica: Nipsil AQ made by Nippon Silica Co., Ltd.
Carbon black: Shoblack N339 made by Showa Cabot K.K.
Silane coupling agent: Si69 made by Degussa Corporation
Anti-oxidant: Nocrac 6C made by Ouchi Shinko Chemical Industrial Co., Ltd.
Stearic acid: beads stearic acid made by NOF Corporation
Zinc oxide: Zinc Oxide #3 made by Seido Chemical Industry Co., Ltd.
Aromatic oil: Desolex #3 made by Showa Shell Sekiyu K.K.
Vulcanization Accelerator 1: Noccelar CZ-G made by Ouchi Shinko Chemical Industrial Co., Ltd.
Vulcanization Accelerator 2: Noccelar D made by Ouchi Shinko Chemical Industrial Co., Ltd.
Sulfur: fine powder sulfur made by Tsurumi Chemical Industry Co., Ltd.

What is claimed is:

1. A method for producing a rubber composition, comprising the steps of:
    preparing a modified natural rubber by releasing protein from rubber particles in a natural rubber latex by adding at least one organic compound selected from the group consisting of formaldehyde, paraformaldehyde, formalin, and glyoxal to the natural rubber latex and then drying so as to include the released protein therein; and
    mixing at least one of carbon black and silica in the modified natural rubber.

2. The method for producing a rubber composition according to claim 1, wherein the natural rubber latex is dried by spraying in an atmosphere of shock waves generated by pulse combustion.

3. The method for producing a rubber composition according to claim 2, wherein 0.005 to 5.0 parts by weight of the organic compound is added with respect to 100 parts by weight of solid components in the natural rubber latex.

4. The method for producing a rubber composition according to claim 3, wherein 20 to 150 parts by weight of the at least one selected from carbon black and silica is mixed with respect to 100 parts by weight of a diene-based rubber comprising the modified natural rubber.

5. The method for producing a rubber composition according to claim 4, wherein the natural rubber latex is at least one selected from field latex and concentrated latex.

6. A pneumatic tire using a rubber composition obtained by the production method according to claim 5.

7. A pneumatic tire comprising a tread portion formed using a rubber composition obtained by the production method according to claim 5.

8. A pneumatic tire using a rubber composition obtained by the production method according to claim 1.

9. A pneumatic tire comprising a tread portion formed using a rubber composition obtained by the production method according to claim 1.

10. The method for producing a rubber composition according to claim 1, wherein the natural rubber latex is at least one selected from field latex and concentrated latex.

11. The method for producing a rubber composition according to claim 1, wherein 20 to 150 parts by weight of the at least one selected from carbon black and silica is mixed with respect to 100 parts by weight of a diene-based rubber comprising the modified natural rubber.

12. The method for producing a rubber composition according to claim 1, wherein 0.005 to 5.0 parts by weight of the organic compound is added with respect to 100 parts by weight of solid components in the natural rubber latex.

13. The method for producing a rubber composition according to claim 12, wherein 20 to 150 parts by weight of the at least one selected from carbon black and silica is mixed with respect to 100 parts by weight of a diene-based rubber comprising the modified natural rubber.

14. The method for producing a rubber composition according to claim 12, wherein the natural rubber latex is at least one selected from field latex and concentrated latex.

15. A pneumatic tire comprising a tread portion formed using a rubber composition obtained by the production method according to claim 12.

16. A pneumatic tire using a rubber composition obtained by the production method according to claim 12.

17. The method for producing a rubber composition according to claim 1, wherein:
    the natural rubber latex is dried by spraying in an atmosphere of shock waves generated by pulse combustion and
    0.005 to 5.0 parts by weight of the organic compound is added with respect to 100 parts by weight of solid components in the natural rubber latex.

18. The method for producing a rubber composition according to claim 1, wherein:
    20 to 150 parts by weight of the at least one selected from carbon black and silica is mixed with respect to 100 parts by weight of a diene-based rubber comprising the modified natural rubber; and
    the natural rubber latex is at least one selected from field latex and concentrated latex.

19. A pneumatic tire using a rubber composition obtained by:
    preparing a modified natural rubber by releasing protein from rubber particles in a natural rubber latex by adding at least one organic compound selected from the group consisting of formaldehyde, paraformaldehyde, formalin, and glyoxal to the natural rubber latex and then drying so as to include the released protein therein; and mixing at least one of carbon black and silica in the modified natural rubber.

20. A pneumatic tire comprising a tread portion formed using a rubber composition obtained by:
preparing a modified natural rubber by releasing protein from rubber particles in a natural rubber latex by adding at least one organic compound selected from the group consisting of formaldehyde, paraformaldehyde, formalin, and glyoxal to the natural rubber latex and then drying so as to include the released protein therein; and
mixing at least one of carbon black and silica in the modified natural rubber.

* * * * *